(12) United States Patent
Florencio et al.

(10) Patent No.: US 6,208,745 B1
(45) Date of Patent: *Mar. 27, 2001

(54) METHOD AND APPARATUS FOR IMBEDDING A WATERMARK INTO A BITSTREAM REPRESENTATION OF A DIGITAL IMAGE SEQUENCE

(75) Inventors: Dinei A. Florencio; Michael A. Isnardi, both of Plainsboro, NJ (US)

(73) Assignee: Sarnoff Corporation, Princeton, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,205

(22) Filed: Dec. 30, 1997

(51) Int. Cl.[7] .............................. G06K 9/00; G06K 9/36; H04L 9/00
(52) U.S. Cl. .......................... 382/100; 382/250; 713/176
(58) Field of Search ................................ 382/232, 250, 382/251, 100; 162/110; 380/4, 51; 713/176

(56) References Cited

U.S. PATENT DOCUMENTS

| 5,530,759 | 6/1996 | Braudaway et al. ............... 380/54 |
| 5,568,570 | 10/1996 | Rabbani .............................. 382/238 |
| 5,636,292 | 6/1997 | Rhoads ............................... 382/232 |
| 5,646,997 | 7/1997 | Barton ................................. 380/23 |
| 5,659,726 | 8/1997 | Sandford, II et al. ............. 707/101 |
| 5,661,574 | 8/1997 | Kawana .............................. 358/501 |
| 5,664,018 | 9/1997 | Leighton ............................ 380/54 |
| 5,778,102 | * 7/1998 | Sandford, II et al. ............. 382/251 |
| 5,825,892 | * 10/1998 | Braudaway et al. ............... 380/51 |
| 5,848,155 | * 12/1998 | Cox .................................... 380/4 |
| 5,862,260 | * 1/1999 | Rhoads ............................... 382/232 |
| 5,915,027 | * 6/1999 | Cox et al. .......................... 380/54 |
| 5,933,798 | * 8/1999 | Linnartz ............................. 702/191 |

FOREIGN PATENT DOCUMENTS 0 805 600 A2  11/1997  (EP).
0 840 513 A2  5/1998  (EP).

OTHER PUBLICATIONS

Adaptive Watermarking in the DCT Domain, Tao et al; IEEE Conference on Acoustics, Speech, and Signal Processing, ISBN: 0–8186–7919–0, vol. 4, pp. 2985–2988, 1997.*

I. Cox, J. Kilian, T. Leighton, T. Shamoon "Secure Spread Spectrum Watermarking for Multimedia", NEC Research Institute, Technical Report 95–10.

F. Hartung, B. Girod, "Watermarking of MPEG–2 encoded video without decoding and re–encoding", Proceedings SPIE 3020: Multimedia Computing and Networking 97 (MMCN 97) Feb. 1997.

F. Hartung, B. Girod, "Digital Watermarking of Raw and Compressed Video", Systems for Video Communication, pp. 205–213, Oct. 1996.

(List continued on next page.)

Primary Examiner—Amelia Au
Assistant Examiner—Mehrdad Dastouri
(74) Attorney, Agent, or Firm—William J. Burke

(57) ABSTRACT

A method and apparatus that inserts watermark information directly into an encoded video bitstream. The method identifies specific blocks or macroblocks in an encoded video bitstieam and inserts the watermark information directly into the bitstream such that these selected blocks are replaced with a block containing watermark information or augmented with watermark information.

18 Claims, 2 Drawing Sheets

OTHER PUBLICATIONS

Hsu Chiou–Ting et al: "Digital watermarking for video" 1997, Proceedings of the 1997 13th International Conference on Digital Signal Processing, DSP. Part 1 (of 2); Santorini, Greece Jul. 2–4 1997, Int Conf Dig Signal Process DSP; International Conference on Digital Signal Processing, DSP 1997 IEEE Piscataway, NJ, USA, pp. 217–219 XP002117860 *the whole document*.

Zhao J et al: "Embedding Robust Labels Into Images for Copyright Protection" Proceedings of the Knowright Conference Proceedings of the International Congress on Intellectual Property Rights for Specialized Information, Knowledge and New Technology, pp. 242–251 XP000603945 *sections 1–3* *figure 2*.

Tao B et al: "Adaptive Watermarking in the DCT Domain", 1997 IEEE International Conference on Acoustics, Speech, and Signal Processing, Neural Networks Munich, Apr. 21–24, 1997, vol. vol. 4, pp. 2985–2988, Institute of Electrical and Electronics Engineers XP000788033ISBN: 0–8186–7919–0 *p. 2985, right–hand column, line 8—p. 2986, right–hand column, line 13*.

Mintzer F et al: "Effective and Ineffective Digital Watermarks", Proceedings of the International Conference on Image Processing ICIP 1998, Santa Barbara, CA Oct. 26–29, 1997, vol. vol. 3 pp. 9–12, Institute of Electrical and Electronic Engineers XP000780838ISNB: 0–8186–8183–7 *the whole document*.

European Search Report corresponding to Application No. EP 98 31 0315.

* cited by examiner

300

METHOD AND APPARATUS FOR IMBEDDING A WATERMARK INTO A BITSTREAM REPRESENTATION OF A DIGITAL IMAGE SEQUENCE

The invention relates to image processing systems and, more particularly, the invention relates to a method and apparatus for performing digital watermarkingofa digital image sequence.

BACKGROUND OF THE DISCLOSURE

With the advent of digitization of images, digital image distribution and digital video availability, copyright protection of such digital imagery has become a substantial issue for image publishers and authors. One technique used to identify digital video ownership is a digital "watermark" that is embedded into an image sequence. Such watermarks must be secure and robust to intentional corruption and to compression processing, not be unreasonably complex to embed and extract, and be compatible and interoperable with conventional image processing systems. For authentication applications, the watermark is generally invisible to a viewer of a decoded image sequence. However, in some applications, it is desirable to produce a visible watermark that can be removed by an authorized image decoder and that can not be removed by an unauthorized decoder.

Various digital watermarking techniques have been attempted for both still and video images with varying levels of success. The use of spread-spectrum techniques are disclosed in Hartung et al., "Digital Watermarking of Raw and Compressed Video", Systems for Video Communication, October 1996, pp. 205–213 and Hartung et al., "Watermarking of MPEG-2 Encoded Video Without Decoding and Reencoding", Proceedings of SPIE 3020, Multimedia Computing and Networking 97 (MMCN 97), February 1997. The first of these papers discloses a technique that spreads the energy of a watermark image throughout a video sequence to be "watermarked" using a pseudo-noise signal. Once the pseudo-noise signal has been embedded into the video sequence, the system encodes the video sequence containing the watermark. In this manner, the watermarking is accomplished in the pixel domain. As such, any coding losses in the video coding process apply to the watermark as well as the images in the video sequence. At the decoder, the spread watermark is correlated and extracted from the video sequence. The use of a spread-spectrum technique requires substantial synchronization and signal processing hardware at both the encoder and decoder to facilitate recovery of the watermark and the video. As such, pixel domain watermark processes are generally avoided.

The second of the aforementioned papers disclose a bitstream domain watermarking technique where the "block" of an image frame within the video sequence is coded and then combined with a coded watermark signal. Specifically, a block is generally an 8×8 pixel portion of an image frame. The block is coded using a discrete cosine transform (DCT) to form a coded block. A watermark image is similarly divided into blocks and DCT coded. The DCT coefficients representing the coded watermark block and the coded image block are then added together to form a combined block. The combined block is quantized and error coded. Thereafter, a selection process is performed to transmit only the "watermarked" coefficients that will not increase the bit rate necessary to transmit the encoded video sequence. This selection process compares the number of bits required to encode coefficients of the combined block with the number of bits required to encode coefficients of the image block only. If the number of combined block bits is greater than the number of image block bits, the system transmits the image block bits; otherwise, the combined block is transmitted. Clearly, such a selection process eliminates some of the watermark information and thus distorts the watermark. In some extreme cases, the watermark information may not be transmitted at all or such a small amount may be transmitted that the watermark is rendered useless. Also, due to the randomness of transmitting or not transmitting each bit, this technique is restricted to spread spectrum or other highly redundant watermarking techniques. The redundancy may be used by an attacker to locate and remove the watermark.

Therefore, a need exists in the art for a watermarking technique that does not remove any amount of watermark signal by inserting a watermark into the encoded bitstream representation of an image sequence.

SUMMARY OF THE INVENTION

The disadvantages associated with the prior art are overcome by the present invention of a method and apparatus that inserts watermark information directly into an encoded video bitstream. The invention identifies certain blocks or macroblocks in an encoded video bitstream and inserts the watermark information directly into the bitstream such that these certain blocks or macroblocks are replaced with a block or macroblock containing watermark information. In its broadest sense, the invention may replace video information in any macroblock or block within a macroblock with a macroblock or block containing watermark information. One form of macroblock that can be replaced with watermark information is a "skipped" macroblock. So-called skipped macroblocks are macroblocks of video information that are deemed inconsequential to the decoding process and, as such, are identified by the encoder as macroblocks that are not to be encoded and transmitted, i.e., skipped. Additionally, macroblocks may contain blocks of information that may be "skipped" and, as such, although a macroblock itself is not skipped, a block within the macroblock may be skipped. Consequently, the invention may insert watermark information into such a skipped block.

In a block-based encoding technique such as MPEG encoding, the video is encoded as defined groups of pictures, where each group of pictures contains particular types of frames known as I, P and B frames. If the watermark information is placed in blocks within B-frames only, then the watermark will generally be invisible. B-frames are not used to predict other frames during decoding; therefore, the watermark will only appear on the screen for a fraction of a second. If, however, the watermark information is placed in an I- or P-frame, where the frame information is used to predict other frames during decoding, the watermark information will be visible in the decoded video unless the watermark is removed from the bitstream by an "authorized" decoder. To further adjust the visibility of the watermark, the amplitude of the discrete cosine transform coefficients that comprise a watermark is adjusted as well as the quantization scale that is used to quantize the watermark DCT coefficients.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
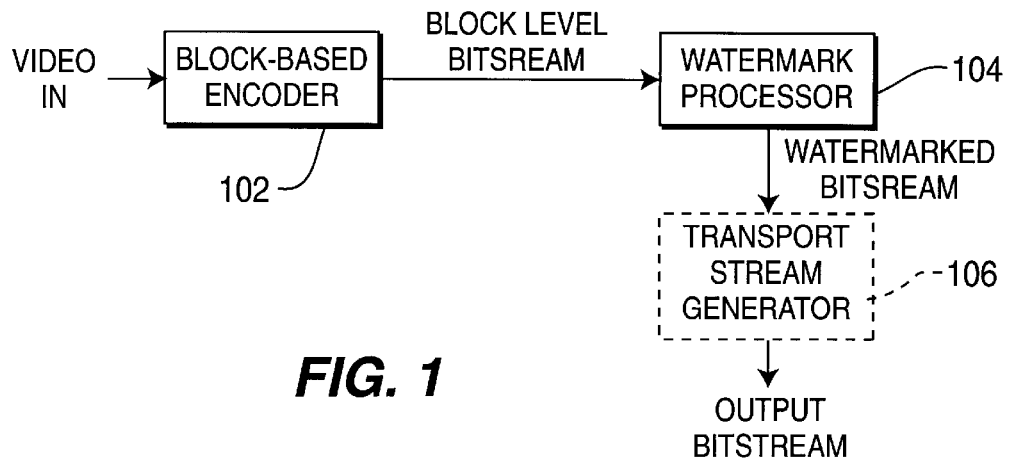
FIG. 1 depicts a block diagram of a block-based video encoder incorporating the present invention for watermarking the encoded video bitstream.

FIG. 1 depicts a block-based video encoder system 100 containing a block-based encoder 102, a watermark processor 104, and an optional transport stream generator 106. The block-based encoder 102 is illustratively an encoder that satisfies the Moving Pictures Experts Group (MPEG) standards for such encoders of video image sequences, i.e., the encoder is generally referred to as an MPEG encoder. This MPEG encoder 102 produces a "block level" bitstream containing a picture header(s) and a sequence of encoded blocks of pixels that represent a frame (picture) within a sequence of images (video). The encoder also produces a plurality of motion vectors (MV) that are related to the encoded frame and are imbedded within the bitstream. The encoded frames are generally classified as I, P and B frames, where I frames are not predicted from any other frames, P frames are encoded using a reference frame, i.e., I frame information or information from another P frame, and B frames are frames that are encoded using two reference frames. i.e., information from an I frame and a P frame or information from two P frames. A detailed description of the encoding process used by an MPEG encoder is described in ISO/IEC International Standard 13818-2, Jan. 20, 1995, the contents of which is herein incorporated by reference.

Although the present invention is discussed as being operative with an MPEG encoder, the inventive watermarking apparatus should be understood as being applicable to any image sequence encoding process that uses a block-based encoding technique, e.g., H.261, MPEG-1, MPEG-2, and the like.

One feature of a block-based coding system that the watermarking technique of the present invention exploits is the feature that skips transmission of certain select blocks of information to conserve transmission bandwidth. For example, in MPEG encoding, a video frame is divided into a plurality of macroblocks, where each macroblock is comprised of a plurality of blocks. In a 4:2:0 chrominance format, a macroblock comprises four 8×8 blocks of luminance data and two 8×8 blocks of chrominance data. In a 4:2:2 chrominance format, there are four blocks of chrominance data and, in a 4:4:4 chrominance format, there are eight blocks of chrominance data. Each macroblock is encoded by performing a discrete cosine transform (DCT) upon each 8×8 block. The DCT coefficients are then quantized to form a plurality of 8×8 blocks containing quantized DCT coefficient blocks. For certain portions of the image, e.g., "flat" regions, the blocks contain very little or no DCT information. Since these blocks contain information that is inconsequential to the decoding technique, the encoder marks these blocks as not necessary to be transmitted (or stored) by the encoder system. As such, they are marked to be "skipped". The marking is accomplished using a "macroblock address increment field" that identifies a particular macroblock's relationship to a previous macroblock. If the increment skips a number, the number skipped is a skipped macroblock. For example, if a first macroblock is associated with an address "158" and the next macroblock has an increment field containing the integer "2" to identify it as macroblock address "160", then the 159th macroblock is a skipped macroblock. The macroblock address increment field is defined in the MPEG standard 13818-2.

Additionally, the skipped blocks may be within a macroblock such that a macroblock may contain some blocks of relevant information and some blocks of irrelevant information. In such instances, the blocks with irrelevant information are not coded and are skipped. These skipped blocks within a macroblock are identified by a "coded block pattern" (CBP) field within the rame header. Generally, the CBP contains a multiple bit word, one bit for each block in a macroblock (e.g., in a 4:2:0 chrominance format there are 6 bits in the CBP for each macroblock, where a "1" indicates that the block is to be coded and a "0" indicates that the block is to be skipped. The present invention inserts watermarks into a bitstream on either the macroblock or block level, or both.

Although in the illustrative embodiments of the invention the watermark information is inserted into the bitstream at locations of the skipped blocks or macroblocks, the invention may be utilized to insert watermark information into any block or macroblock within a bitstream. In particular, a certain criteria can be used to select particular blocks or macroblocks and insert watermark information by substituting the watermark DCT coefficients for those of the blocks, by adding the watermark DCT coefficient values to those of the blocks, or by otherwise combining the DCT coefficients of the watermark with those of the blocks in the bitstream. The block selection criteria may be one of any available criteria. One example is to identify blocks within a "busy" or complex region of the video image and inserting the watermark information into that area. Such a region may be identified by monitoring the amplitude of high frequency DCT coefficients within the video frames or using a subjective standard such as a Just Noticeable Differences (JND) technique as described in U.S. patent application Ser. No. 08/730,275, filed Oct. 15, 1996 and incorporated herein by reference. By inserting the watermark into a busy region, any image distortion caused by the watermarking process will be unnoticeable because the busy region masks the distortion. The present invention is embodied in the watermark processor 104. This processor generates a watermark, processes the watermark to produce a representation that is compatible with the bitstream (i.e., for an MPEG encoder, the watermark is divided into blocks, then DCT processed and quantized to form a plurality of compatible macroblocks), selects certain ones of the "skipped" macroblocks or blocks, replaces the selected skipped macroblocks or blocks with watermark macroblocks or blocks and outputs the watermarked bitstream. The watermarked bitstream is then further processed, as needed, by the optional transport stream generator 106 to form an MPEG compliant transport stream.

To insert an invisible watermark, the watermarking technique is generally applied to B-frames. As such, the watermarked frame is not used by the decoder to reconstruct any other frames and, consequently, the watermark would only appear on the screen for a fraction of a second. Although the watermark only appears in a single frame or multiple frames distributed throughout the decoded sequence the decoded video can be searched and the watermark could easily be identified to authenticate a transmission. On the other hand, if a watermark is intended to be visible, the watermark can be inserted into one or more I or P frames. As such, the watermarked frame would be used by the decoder to reconstruct other frames and, consequently, would appear on the screen for long durations. Additionally, the watermark can be made more or less prominent within a display by adjusting the amplitude of the DCT coefficients of the watermark and adjusting the quantization scale used to quantize the watermark DCT coefficients.

Figure 2:
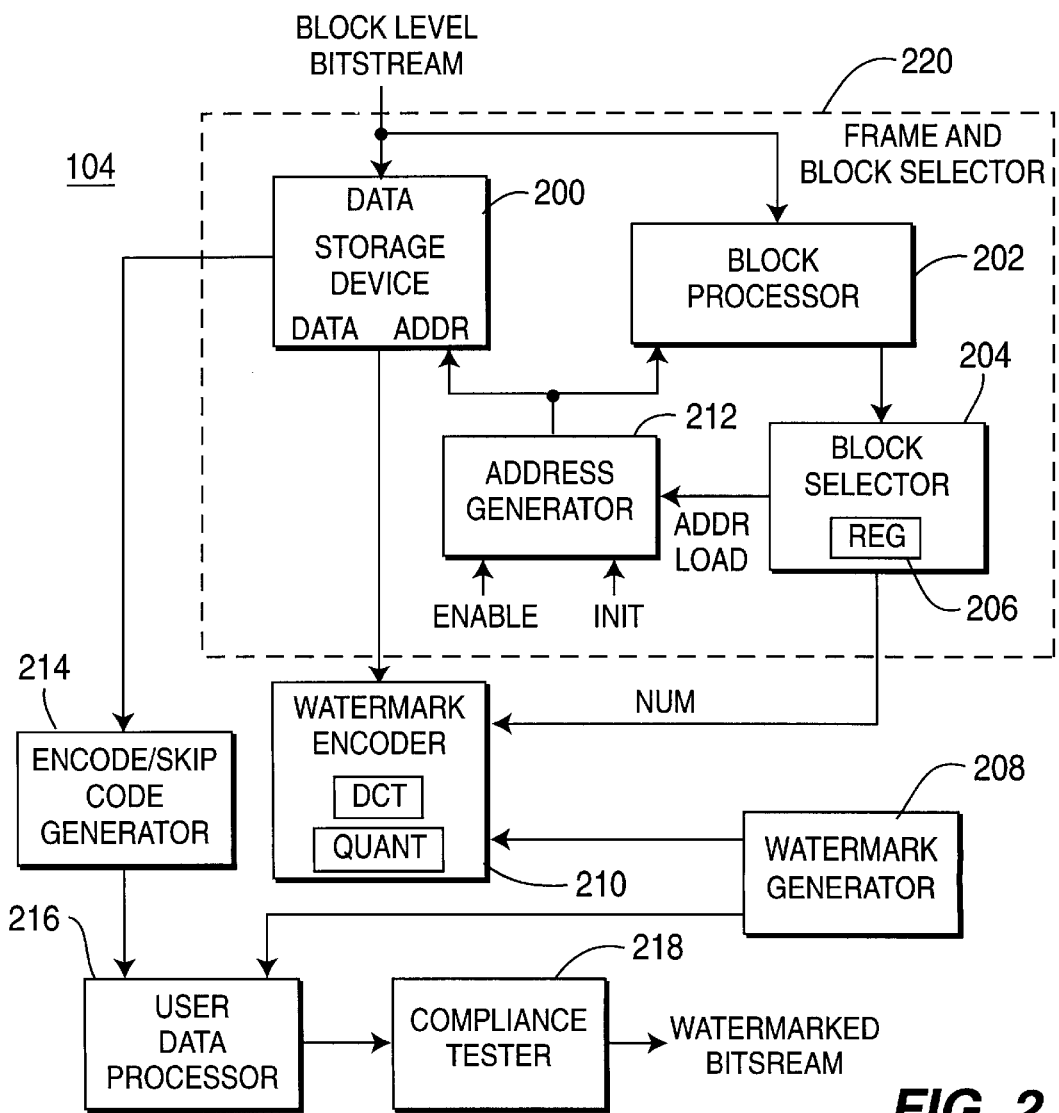
FIG. 2 depicts a detailed block diagram of a watermark processor of the present invention.

FIG. 2 depicts a detailed block diagram of the watermark processor 104 of the present invention. The processor 104 comprises a frame and block selector 220, a watermark encoder 210, a watermark generator 208, an encode/skip code generator 214, a user data processor 216, and a compliance tester 218. The frame and block selector further comprises a storage device 200, a block processor 202, a block selector 204, and an address generator 212. The block level bitstream is coupled to the storage device 200 within the selector 220 where a picture header and its accompanying data, e.g., macroblocks and their constituent blocks of quantized DCT coefficients, are sequentially stored. Note that the term "blocks" is used generically to mean any size or shape group of DCT values (or quantized DCT values) representing the information within a portion of an image, and this term is intended to include macroblocks as well as the blocks within macroblocks. As the blocks are stored, the block processor 202 identifies the blocks that are "skipped" within a selected frame. The skipped macroblocks are identified by reading the macroblock address increment field and the skipped blocks are identified using the CBP field. The block processor 202 is also provided with the storage address (ADDR) for each block. As such, the block processor 202 correlates the skipped blocks with a storage address and provides the storage address of each skipped block to a block selector 204.

The block selector 204 contains a register 206, where the skipped block storage addresses are temporarily stored. The block selector 204 determines how many blocks are available in a selected frame for use as watermark blocks. In other words, the block selector counts the number of skipped blocks within the selected frame by monitoring the macroblock increment field and/or the CBP field. The block selector 204 provides the number of blocks (NUM) that are available for watermarking to the watermark encoder 210 and provides a first address of a first skipped block that is to be watermarked to the address generator 212. The address is generally provided to an address load port (ADDR LOAD) of the address generator 212.

The watermark encoder 210 is coupled to a watermark generator 208. The watermark generator 208 may provide either a deterministic or pseudorandom watermark code. A deterministic watermark can be a digitized logo or a company name that has been converted into an ASCII character string and then into a binary number string. A pseudorandom watermark is a pseudorandomly generated binary number string that can be used as a secure watermark. A combination of the two forms may use a pseudorandom code generator to spread the energy of the logo over an image region. In short, any form of watermark or other identifying code can be used as a watermark.

The watermark encoder 210 encodes the watermark by dividing the watermark into a plurality of blocks. The number of blocks is defined by the number (NUM) of skipped blocks selected by the block selector 204. The watermark blocks are DCT processed and quantized to form blocks that match those that are contained in the bitstream. Other well-known processing may be accomplished to conform the watermark to the bitstream such as decimation, filtering, scaling and the like. These encoded watermark blocks are stored in the storage device 200 at the addresses of the selected skipped blocks. The storage addresses are provided by the block selector 204 to the address generator 212. When the address generator 212 is enabled, the address at the address load port is coupled to the address line of (ADDR) the storage device 200. Consequently, the watermark block is stored at that address location in the storage device 200 and replaces the previously stored block at that location. This is repeated for each available watermark block until the selected skipped blocks are all replaced.

Once the frame has been updated with the watermarked blocks, the address generator 212 is initialized to generate sequential addresses such that the bitstream is retrieved from the storage device 200 in the order that is was stored. The retrieved bitstream is coupled to the encode/skip code generator 214 which provides updated CBP field and watermark increment field information to the storage device 200. This new field information are inserted into the picture header to identify the watermarked blocks as blocks that are encoded.

The bitstream is then coupled to a user data processor 216 where the user data within the bitstream is updated with any information that is necessary to decode and/or remove the watermark from the images. This information is provided by the watermark generator 208 and coupled to the user data processor 216. For example, if the watermark is a pseudo-random code, the "seed" for that code may be transmitted as user data such that a decoder can decode the watermark and remove it from the decoded video stream.

Lastly, the resultant bitstream is compliance tested using compliance tester 218, to ensure that the bitstream, as watermarked, complies with the MPEG standard, e.g., the compliance tester checks the byte alignment at the end of each slice of picture information by monitoring the number of block insertions accomplished within a particular slice and the virtual buffer verifier constraints to ensure that a buffer overflow or underflow does not result when watermark blocks are inserted into the bitstream. If an underflow or overflow condition is imminent, feedback can be supplied to the encoder to increase or decrease the bits used in the next macroblock that is encoded to compensate for the watermark insertion.

As a result of using the watermark processor of the present invention, a watermark code or encoded watermark image is inserted directly into the bitstream. The MPEG compliant bitstream is now ready for optional packetization into a transport stream for transmission to a decoder.

Figure 3:
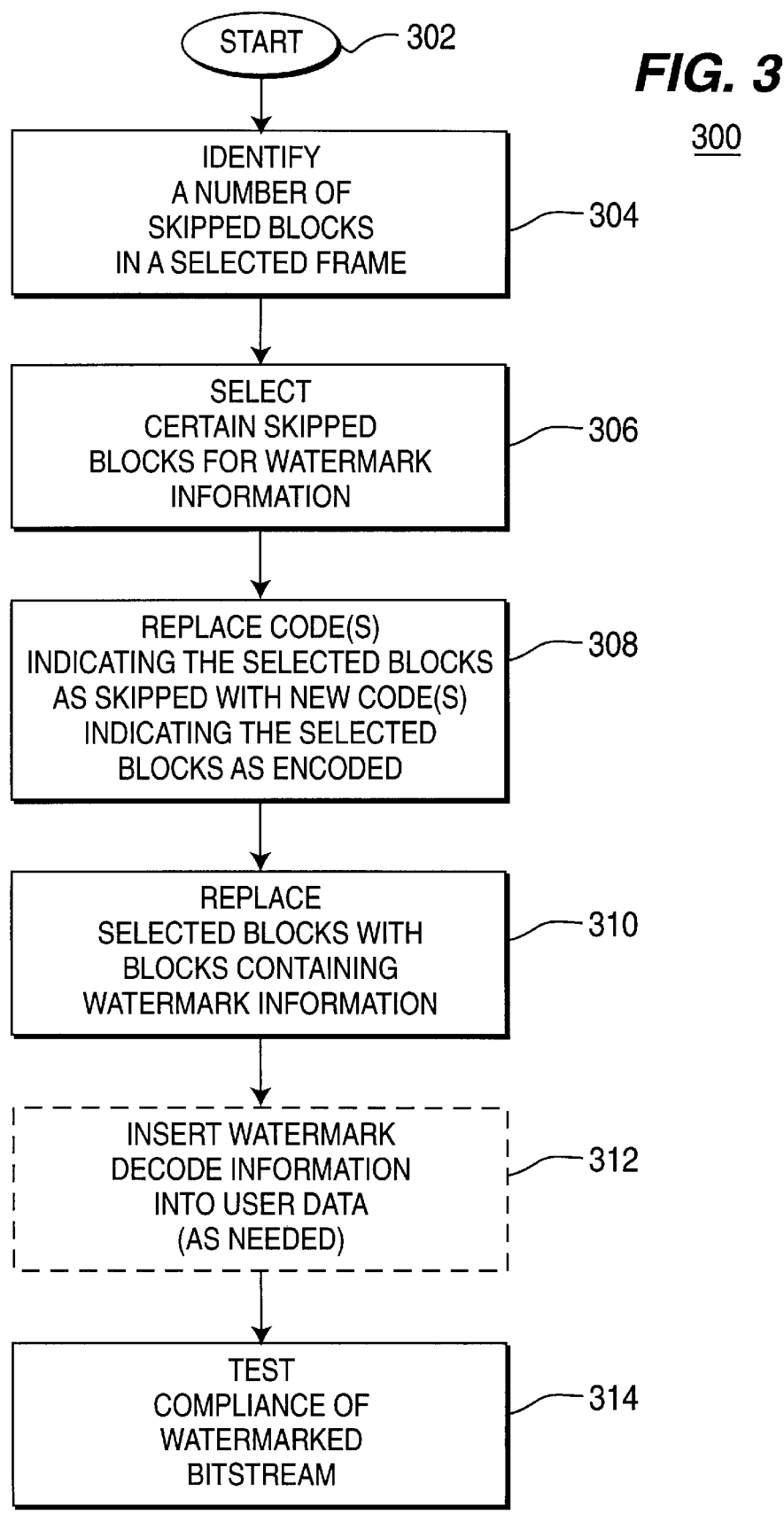
FIG. 3 depicts a flow diagram of a method of operation for the watermark processor of FIG. 2.

FIG. 3 depicts a flow diagram that summarizes the operational method 300 of the watermark processor 104 of FIG. 2 that inserts the watermark information into skipped blocks within a macroblock. The method 300 begins at step 302 and proceeds to step 304 where the number of skipped blocks are identified. At step 306, a certain number of the skipped blocks are selected for watermarking. The selection is generally based upon the total number of blocks necessary to contain the watermark and, the location of the blocks within the image, e.g., placing the watermark in a "busy" region of the frame. If the watermark is a rather simple code then less blocks are needed; however, if the watermark is an image or logo, more blocks are needed to contain the watermark data.

For example, in an MPEG encoder, the bitstream can be scanned to find a B-frame containing a CBP field having the following bits 111100 representing a macroblock where all the Y blocks are coded, but not the U and V blocks. The U and V blocks within the macroblock are to be skipped.

At step 308, the CBP field that identifies the skipped blocks as those blocks to be skipped is updated to indicate that those blocks are to be encoded. In the simple example, the CBP is changed to 111110 to indicate that one of the previous skipped blocks, the U block, now contains encoded data. In a system for inserting the watermark information on a macroblocks level, step 306 monitors the macroblock address increment field to identify skipped macroblocks and step 308 updates the macroblock address increment field to identify macroblocks that now contain watermark information.

At step 310, the selected blocks are replaced with blocks containing the watermark information. Generally, the watermark information is encoded as an array of Huffman coded, zig-zag scanned, quantized DCT coefficients. An appropriate number of zeros may be required to be inserted at the end of the slice containing the watermark block. Such zero insertion preserves the byte alignment.

At optional step 312, the method inserts watermark decoding information into the user data of the bitstream, as needed. This step adds information that assists the decoder in locating and decoding the watermark. Such data may be a seed for a pseudorandom code that formed the basis for the watermark and/or a location identifier for each watermark such that the decoder can easily remove the watermark from the decoded image sequence.

As such, an authorized decoder can remove a visible watermark to produce a "clean" image sequence; while an unauthorized decoder would produce a distorted image sequence containing the visible watermark. If any video signals were removed from the stream to insert the watermark, the information can be sent to the decoder as "user data" such that an authorized decoder can replace the watermark information carrying blocks with the video signal information carrying blocks and produce an undistorted frame.

At step 314, the method tests the watermarked bitstream for compliance with the encoding standard, e.g., MPEG. The resultant bitstream is a compliant bitstream containing a watermark in certain select blocks of certain select frames of the stream. If the bitstream is, for example, deemed to violate a bit budget for the stream (i.e., too many bits are being used to code the image that the decoder will not accurately decode the image sequence), the stream may be adjusted to compensate for the extra bits added by the watermark information being in the stream. Such compensation can be accomplished by removing data blocks from the stream until the bit rate is within bounds.

When decoded, the watermark will either be visible or invisible depending upon the types of frames into which the watermark was inserted and the "strength" of the watermark, i.e., the magnitude of the watermark DCT coefficients as well as the quantization scale used to quantize the watermark DCT coefficients. Generally, to have an invisible watermark (a preferred condition when the watermark is to be used for authentication), the watermark information is placed within skipped blocks in one or more B-type frame. As such, upon decoding, the watermark information does not propagate to other frames since B-frames are not used to predict other frames. Consequently, the watermark would appear (flash) on the screen during the frame time of the decoded B-frame, e.g., 1/30 of a second. Further invisibility is produced when low magnitude, high frequency DCT coefficients are used to represent the watermark and the watermark is inserted in a "busy" portion of the frame In applications where the watermark is to be visible, the I or P frames are selected to carry the watermark information. P-frames contain skipped blocks that may be replaced as described above; however I-frames do not have skipped blocks and actual data carrying blocks would need to be replaced by the watermark blocks. By using low frequency, high magnitude DCT watermark coefficients, the watermark would easily be seen on the screen as the I and P-frames are used to predict other frames such that the watermark image would appear on the screen in many of the decoded frames.

If not enough skipped blocks are available to carry the watermark information or I-frames are to carry the watermark, then the present invention selects blocks having low energy (e.g., high frequency, low magnitude DCT coefficients) for replacement with the watermark blocks. In addition, to utilize the invention without selecting skipped blocks, the watermark information could be inserted into the bitstream as added information or to substitute information within any low energy blocks. Thus, the block processor 202 would identify low energy blocks rather than skipped blocks. The remainder of the system of FIG. 2 would operate as described above without the need to update the fields that identify skipped blocks. Also, if a block is replaced by the watermark information, the information from the replaced block could be inserted as "user data" in the bitstream such that a decoder would be able to use that data for image regeneration.

The watermark information that is contained in the block (s) can be the same for every block or, to combat unauthorized attempts to alter the watermark, the watermark information may change from block to block or frame to frame.

Using the embodiment of the invention described herein, watermark information is inserted directly into the bitstream representation of an image sequence. Consequently, a standard image sequence encoder, e.g., MPEG encoder, can be used to produce a compliant block level bitstream. The bitstream is altered to insert the watermark information. The insertion process permits the watermark, upon decoding, to be selectively visible or invisible depending upon the location in the bitstream that the watermark was inserted, i.e., the type of frame used to carry the watermark. Consequently, the invention provides a flexible and robust technique for watermarking a sequence of images.

Although various embodiments which incorporate the teachings of the present invention have been shown and described in detail herein, those skilled in the art can readily devise many other varied embodiments that still incorporate these teachings.

What is claimed is:

1. A method of inserting a watermark into a block-level bitstream containing an encoded sequence of images, comprising the steps of:

identifying, within the block-level bitstream, a potentially skipped block for alteration which, if image information in the potentially skipped block is altered, a decoded sequence of images containing the potentially skipped block would be inconsequentially impacted;

selecting said identified block within a frame as a selected block;

combining the selected block with a block containing watermark information; and whereby the block level bitstream is watermarked.

2. The method of claim 1 wherein said frame within which said potentially skipped block is selected is a particular type of frame.

3. The method of claim 2 wherein the particular type of frame is used for predicting the content of other frames during bitstream decoding.

4. The method of claim 2 wherein the particular type of frame is not used for predicting the content of other frames during bitstream decoding.

5. The method of claim 1 wherein said block containing said watermark information is produced by the following steps:

providing a watermark image;

performing a discrete cosine transform upon said watermark image to produce a plurality of DCT coefficients; and quantizing said DCT coefficients to produce at least one block of quantized DCT coefficients that form said block of watermark information.

6. The method of claim 1 wherein said block of watermark information is a pseudorandom or deterministic code.

7. The method of claim 1 further comprising the step of:

altering user data of the block level bitstream to include watermark decoding information.

8. The method of claim 1 wherein said selecting step further comprises the steps of:

identifying a busy region within the frame; and selecting said block within said busy region.

9. The method of claim 1 wherein said selecting step further comprises the steps of:

identifying a certain region within the frame using a subjective criterion; and selecting said block within said certain region.

10. The method of claim 1 wherein said combining step further comprises the step of:

replacing the selected block with a block containing watermark information.

11. Apparatus for inserting a watermark into a block-level bitstream containing an encoded sequence of images, comprising:

a frame and block selector for identifying, within the block-level bitstream, a potentially skipped block for alteration which, if image information in the potentially skipped block is altered, a decoded sequence of images containing the potentially skipped block would be inconsequentially impacted, and for selecting the potentially skipped block within a frame as a selected block;

a watermark encoder, coupled to said frame and block selector, for producing a block containing watermark information; and where said frame and block selector combines the selected block with said block containing watermark information to watermark the block level bitstream.

12. The method of claim 11 wherein said frame within which said potentially skipped block is selected is a particular type of frame.

13. The apparatus of claim 12 wherein the particular type of frame is used for predicting the content of other frames during bitstream decoding.

14. The apparatus of claim 12 wherein the particular type of frame is used for predicting the content of other frames during bitstream decoding.

15. The apparatus of claim 11 wherein said watermark encoder is coupled to a watermark generator for providing the watermark encoder a watermark image, and said watermark encoder further comprises:

a discrete cosine transform unit for performing a discrete cosine transform upon said watermark image to produce a plurality of DCT coefficients; and a quantizer for quantizing said DCT coefficients to produce at least one block of quantized DCT coefficients that form said block of watermark information.

16. The apparatus of claim 11 wherein said block of watermark information is a pseudorandom or deterministic code.

17. The apparatus of claim 11 further comprises:

a user data processor for altering the user data of the block level bitstream to include watermark decoding information.

18. The apparatus of claim 11 wherein said frame and block selector replaces the selected block with said block containing watermark information to watermark the block level bitstream.

* * * * *